United States Patent
Koppal (10) Patent No.: US 9,767,545 B2
(45) Date of Patent: Sep. 19, 2017

(54) DEPTH SENSOR DATA WITH REAL-TIME PROCESSING OF SCENE SENSOR DATA

(71) Applicant: Texas Instruments Incorporated, Dallas, TX (US)

(72) Inventor: Sanjeev Jagannatha Koppal, Gainesville, FL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 127 days.

(21) Appl. No.: 14/292,897

(22) Filed: May 31, 2014

(65) Prior Publication Data

US 2015/0023563 A1  Jan. 22, 2015

Related U.S. Application Data (60) Provisional application No. 61/846,851, filed on Jul. 16, 2013.

(51) Int. Cl.
G06T 7/00 (2017.01)
G06T 5/50 (2006.01)
G06T 7/30 (2017.01)

(52) U.S. Cl.
CPC ............ *G06T 5/50* (2013.01); *G06T 7/30* (2017.01); *G06T 2207/10016* (2013.01); *G06T 2207/10024* (2013.01); *G06T 2207/10028* (2013.01)

(58) Field of Classification Search
None
See application file for complete search history.

(56) References Cited

U.S. PATENT DOCUMENTS

2012/0196679 A1* 8/2012 Newcombe ........... G06T 7/2046
463/36
2013/0033582 A1* 2/2013 Sun .................... H04N 13/0018
348/47
2013/0272581 A1  10/2013 Moden

OTHER PUBLICATIONS

Camera Calibration from Multiple Views. Harvey Rhody. Mar. 2006.*
Image Alignment and Stitching: A Tutorial. Richard Szeliski. 2006.*
Video Stabilization with a Depth Camera. VShuaicheng Liu, YintingWang, Lu Yuan, Jiajun Bu, Ping Tan, and Jian Sun. 2012.*
Richard Szeliski, "Image Alignment and Stitching: A Tutorial", Foundations and Trends in Computer Graphics and Vision, vol. 2, No. 1, Jan. 2006, Now Publishers Inc, Hanover, MA, pp. 1-104.
"OPT8130 and OPT8140 3D Time of Flight Analog Output DepthSense Image Sensors", SLAB063, 2013, Texas Instruments, Inc., Dallas, TX, pp. 1-2.

(Continued)

*Primary Examiner* — Delomia L Gilliard
(74) *Attorney, Agent, or Firm* — Gregory J. Albin; Charles A. Brill; Frank D. Cimino (57) ABSTRACT

A method of improving depth sensor data in real-time based on scene sensor data is provided that includes aligning depth images of depth-scene image pairs generated by a depth-scene image sensor pair with corresponding scene images wherein, for each depth-scene image pair, the depth image is warped such that locations of depths in the depth image are aligned with locations of corresponding pixels in the scene image, and improving at least some of the aligned depth images based on image data from one or more of the scene images.

14 Claims, 6 Drawing Sheets

(56) References Cited

OTHER PUBLICATIONS

Marc Pollefeys and Luc Van Gool, "Self-Calibration from the Absolute Conic on the Plane at Infinity", Proceedings 7th International Conference on Computer Analysis of Images and Patterns, Sep. 10-12, 1997, Kiel, Germany, pp. 175-182.

"Homography (computer vision)", Wikipedia, pp. 1-4, available at http://en.wikipedia.org/w/index.php?title=Homography_(computer_vision)&oldid=606753452, last modified May 2, 2014.

Larry Li, "Time-of-Flight Camera—An Introduction", Texas Instruments, Inc., Technical White Paper SLOA190B, Jan. 2014, revised May 2014, pp. 1-10.

Fundamental matrix (computer vision), Wikipedia, pp. 1-5, available at http://en.wikipedia.org/w/index.php?title=Fundamental_matrix_(computer_vision)&oldid=599746156, last modified Mar. 15, 2014.

"Camera matrix", Wikipedia, pp. 1-5, available at http://en.wikipedia.org/w/index.php?title=Camera_matrix&oldid=583233158, last modified Nov. 25, 2013.

George Bebis, "Camera Parameters: CS485/685 Computer Vision", University of Nevada Lecture, Reno, Nevada, pp. 1-50, available at http://www.cse.unr.edu/~bebis/CS485/Lectures/CameraParameters.ppt, last visited May 31, 2014.

Harvey Rhody, "Camera Calibration from Multiple Views", Rochester Institute of Technology, Rochester, NY, Mar. 28, 2006, pp. 1-22.

\* cited by examiner

TOF AMPLITUDE IMAGE      TOF DEPTH MAP

HIGH-RES RGB IMAGE      ALIGNED DEPTH MAP

DEPTH SENSOR DATA WITH REAL-TIME PROCESSING OF SCENE SENSOR DATA

CROSS-REFERENCE TO RELATED APPLICATIONS

This application claims benefit of U.S. Provisional Patent Application Ser. No. 61/846,851, filed Jul. 16, 2013, which is incorporated by reference herein in its entirety.

BACKGROUND OF THE INVENTION

Field of the Invention

Embodiments of the present invention generally relate to improving depth sensor data, i.e., depth images, with real-time processing of scene sensor data.

Description of the Related Art

Time-of-flight (TOF) sensors, sometimes also referred to as TOF cameras, provide a "depth" image of a scene. Many imaging solutions combine a TOF sensor along with a red-green-blue (RGB) sensor such that the TOF sensor provides the depth and shape of objects in a scene while the RGB sensor provides the color and appearance of the scene. The depth images from TOF sensors may need improvement as such sensors may have, for example, a limited working depth range, systemic noisy errors, and/or errors when the scene is shiny, glossy, or metallic.

SUMMARY

Embodiments of the present invention relate to methods, apparatus, and computer readable media for improving depth sensor data, i.e., depth images, with real-time processing of scene sensor data. In one aspect, a method of improving depth sensor data in real-time based on scene sensor data is provided that includes aligning depth images of depth-scene image pairs generated by a depth-scene image sensor pair with corresponding scene images wherein, for each depth-scene image pair, the depth image is warped such that locations of depths in the depth image are aligned with locations of corresponding pixels in the scene image, and improving at least some of the aligned depth images based on image data from one or more of the scene images.

In one aspect, a digital video system is provided that includes a depth-scene image sensor pair configured to capture depth-scene image pairs of a scene, means for aligning depth images of depth-scene image pairs generated by the depth-scene image sensor pair with corresponding scene images wherein, for each depth-scene image pair, the depth image is warped such that locations of depths in the depth image are aligned with locations of corresponding pixels in the scene image, and means for improving at least some of the aligned depth images based on image data from one or more of the scene images.

In one aspect, a non-transitory computer readable medium that stores software instructions that, when executed by at least one processor in a digital video system, cause a method of improving depth sensor data in real-time based on scene sensor data to be performed. The method includes aligning depth images of depth-scene image pairs generated by a depth-scene image sensor pair with corresponding scene images wherein, for each depth-scene image pair, the depth image is warped such that locations of depths in the depth image are aligned with locations of corresponding pixels in the scene image, and improving at least some of the aligned depth images based on image data from one or more of the scene images.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. For simplicity of explanation, embodiments are described herein assuming that in a depth-scene sensor pair, the scene image sensor is a red-green-blue (RGB) sensor and the depth sensor is a time-of-flight (TOF) sensor. One of ordinary skill in the art will understand embodiments in which the scene image sensor may be, for example, a grayscale image sensor, a hyperspectral image sensor, or any other type of image sensor configured to provide the color and appearance of a scene and/or the depth sensor may be any suitable depth sensor, such as, for example, a structured light depth sensor. As used herein, the term "homography" refers to a three-dimensional (3D) homography specified by a 4×4 matrix.

Figure 1:
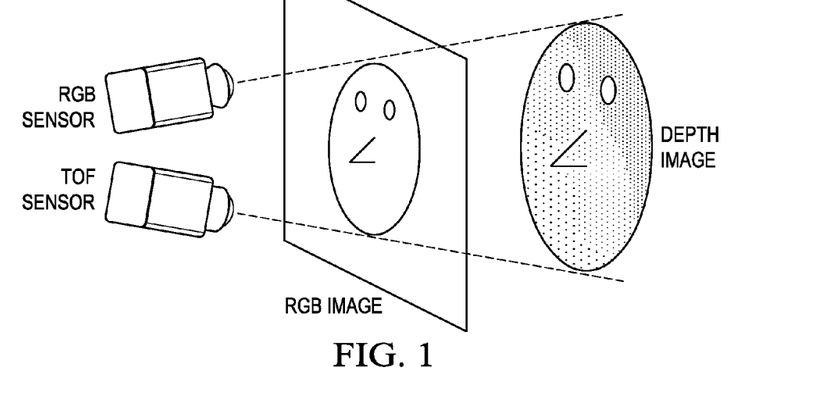
FIG. 1 is a simple example of a red-green-blue (RGB) sensor paired with a TOF sensor.

FIG. 1 is a simple example of a red-green-blue (RGB) image sensor paired with a TOF sensor. The RGB sensor generates RGB images of the scene and the TOF sensor generates depth images of the scene. As previously mentioned, depth images from a time-of-flight (TOF) sensor may include errors due to, for example, limited working depth range, systemic noise, and/or presence of shiny, metallic, or glossy objects in a scene. Further, outdoor scenes are notoriously difficult for TOF sensors. Embodiments of the invention provide for real-time improvement of the depth images of the TOF sensor in a TOF-RGB sensor pair using image data from the RGB sensor.

Figure 2:
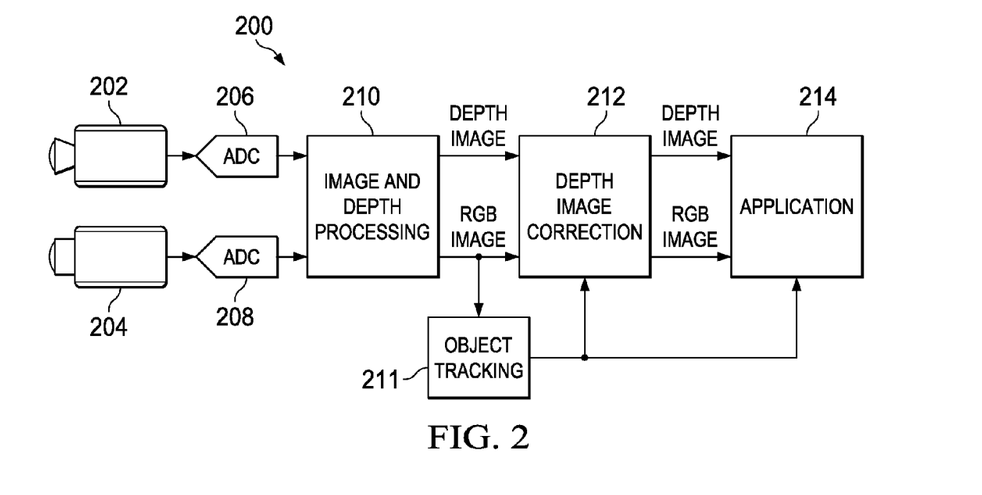
FIG. 2 is a block diagram of an example digital video system.

FIG. 2 is a block diagram of an example digital video system 200 with a TOF-RGB sensor pair. The digital video system 200 includes an RGB imaging component 202, a TOF imaging component 204, two analog to digital (ADC) conversion components 206, 208, an image and depth processing component 210, an object tracking component 211, a depth image correction component 212, and an application component 214.

The components of the digital video system 200 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions implementing some or all of the functionality of one or more of the components may be stored in memory (not shown) and executed by one or more of the processors. Some or all of the software instructions may be initially stored in a computer-readable medium such as a compact disc (CD), a diskette, a tape, a file, memory, or any other computer readable storage device and loaded and stored on the digital video system 200. In some cases, the software instructions may also be sold in a computer program product, which includes the computer-readable medium and packaging materials for the computer-readable medium. In some cases, the software instructions may be distributed to the digital video system 200 via removable computer readable media (e.g., floppy disk, optical disk, flash memory, USB key), via a transmission path from computer readable media on another computer system (e.g., a server), etc The RGB imaging component 202 is an RGB imaging sensor system arranged to capture RGB image signals of a scene and the TOF imaging component 204 is a TOF imaging sensor system arranged to capture TOF signals of scene. The RGB imaging sensor component 106 includes a lens assembly, a lens actuator, an aperture, and a suitable imaging sensor. The TOF imaging component 204 is configured to illuminate the scene with a modulated light source and to observe the reflected light. More specifically, the TOF imaging component 204 includes a lens assembly, a lens actuator, an aperture, an illumination unit arranged to project modulated light, e.g., infrared light, into the scene, and a suitable imaging sensor designed to respond to the same spectrum as the projected light and to convert the photonic energy to electrical current. Each pixel captured by the imaging sensor measures the time taken for the light from the illumination unit to reach surfaces in the scene and return. The digital video system 200 includes circuitry for controlling various aspects of the operation of the RGB imaging component 202 and the TOF imaging component 204, such as, for example, aperture opening amount, exposure time, synchronization of image capture by the two imaging components, etc.

In some embodiments, the RGB imaging component 202 and the TOF imaging component 204 may be arranged vertically such that one component is on top of the other, i.e., the two components have a vertical separation baseline. In some embodiments, the RGB imaging component 202 and the TOF imaging component 204 may be arranged horizontally such that one component is next to the other, i.e., the two components have a horizontal separation baseline.

The analog-to-digital (ADC) conversion components 206, 208 receive analog image signals from the respective imaging components 202, 204 and convert the analog image signals to digital image signals for further processing by the image and depth processing component 210.

The image and depth processing component 210 divides the incoming digital signal(s) into frames of pixels and processes each frame to enhance the image data in the frame. For the RGB frames, the processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. For the TOF frames, the processing performed may include faulty pixel correction, denoising, de-aliasing, frequency tuning and temperature compensation.

The image and depth processing component 104 generates a depth image from the enhanced TOF image data. Any suitable algorithm may be used to generate the depth image from the enhanced image data. In addition, the image and depth processing component 210 may perform an embodiment of the method for geometric calibration of FIG. 4 to generate a homography and projection matrices to be used for aligning corresponding depth and RGB images. Further, once the homography and the projection matrices are generated, the image and depth processing component uses the inverse of the homography and the projection matrices to align the two images of depth-RGB image pairs.

The object tracking component 211 receives a stream of RGB images from the image and depth processing component 210 and detects and tracks objects in the RGB image stream. Techniques for tracking objects in RGB video streams are well-known and any suitable tracking technique may be used. In some embodiments, the particular object tracking algorithms used may be selected based on the particular application 214. Further, as described in more detail in reference to the method of FIG. 3, the particular object tracking algorithms used may be selected based on the particular error correction to be performed on depth images by the depth image correction component 212 as the error detection and correction may need specific information from object tracking.

The depth image correction component 212 receives aligned RGB-depth image pairs and information regarding tracked objects in the RGB video stream from the object tracking component 211, performs error detection on the depth image, and corrects any detected errors using the tracked object information. The particular errors detected and the algorithm(s) applied to correct detected errors in the depth image are implementation dependent. Further, the particular errors detected and the algorithm(s) applied to correct detected errors in the depth image may depend on the particular application 214. Error detection and correction that may be performed by the depth image correction component 212 are described in more detail in reference to the method of FIG. 3.

The application component 214 receives the error-corrected depth image from the depth image correction component 212, the corresponding RGB image, and object tracking data from the object tracking component 211, and performs any additional processing needed for the particular application of the digital video system 200. The application component 214 may implement any application or applications that rely on knowledge of depth in a scene. For example, the application component 214 may be a 3D reconstruction application that generates point clouds (a collection of x, y, and z coordinates representing the locations of objects in 3D space) from depth maps. In another example, the application component 214 may be an automotive forward collision warning application that calculates how far an object is from the vehicle, tracks the object over time to determine if the vehicle is rapidly approaching it, and warns the driver of an impending collision. In another example, the application component 214 may be an automotive pedestrian detection application. In another example, the application component 214 may be a 3D person tracking application. In another example, the application component 214 may be a 3D surveillance application. In another example, the application component 214 may be a gesture detection application. In another example, the application component 214 may be a refocusing application. In another example, the application component 214 may be a virtual viewpoint rendering application. In another example, the application component 214 may be a 3D scanning and printing application.

Figure 3:
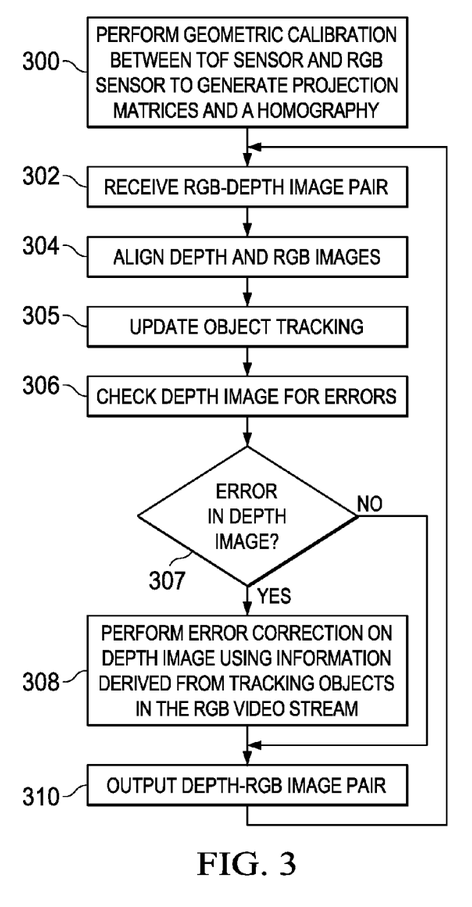
FIGS. 3, 4, and 11 are flow diagrams of methods.

FIG. 3 is a flow diagram of a method for improving depth images from a TOF sensor that may be performed, for example, by the digital video system 200 of FIG. 2. In general, in this method, object tracking is performed using the RGB images of the incoming depth-RGB image pairs and information derived from the object tracking is used to improve the depth images, i.e., to correct detected errors in the depth images. As shown in FIG. 3, initially, geometric calibration is performed 300 between the TOF sensor and the RGB sensor of a TOF-RGB sensor pair as per the method of FIG. 4. As is explained in more detail herein in reference to FIG. 4, the geometric calibration results in a homography H that relates the pixel coordinates of an RGB image in a depth-RGB image pair to point coordinates of the depth image, a TOF sensor projection matrix $P'_{depth}$, and an RGB sensor projection matrix $P'_{rgb}$, all of which are to be used for aligning depth-RGB image pairs from the TOF-RGB sensor pair.

For each depth-RGB image pair received 302, the images are aligned 304 by applying the inverse of the homography H, i.e., $H^{-1}$, to the depth image to generate a warped depth image, and then applying the RGB sensor projection matrix $P'_{rgb}$ to the warped depth image to map the points of the warped depth image to pixel locations in the RGB image. The result is a depth image that is aligned with the scene image. Generating the warped depth image may be referred to as going from a TOF sensor projection matrix and a depth image location to a ray for each location in the depth image. The ray with the depth image location value (the depth) is a point $q=[x\ y\ z]$ corresponding to that location where $[x\ y\ z]$ is a column. The inverse homography $H^{-1}$ is applied to each point q, i.e., $H^{-1}*[x\ y\ z\ 1]$. The resulting aligned depth image is the same size as the RGB image and the points of the warped depth image are aligned with pixels of the RGB image. In some embodiments, the resolution of the TOF sensor may be less than that of the RGB sensor, in which case the original depth image is smaller than the RGB image. Thus, after the RGB sensor projection matrix is applied, there will be locations in the aligned depth image without a valid depth value. Interpolation is performed on the aligned depth image to generate these depth values.

The object tracking is then updated 305 based on the content of the aligned RGB image. Object tracking is well understood and any suitable object tracking algorithms may be used. In some embodiments, the particular object tracking algorithms used may depend on the application of the digital video system implementing the method. In some embodiments, the particular object tracking algorithms used may depend on the type(s) of error correction to be performed on the depth images.

The depth image is also checked 307 for errors. Error detection that may be performed is described in more detail below. If there are no errors, the aligned depth-RGB image pair is output, and processing continues 302 with the next depth-RGB image pair. Otherwise, error correction is performed 308 on the aligned depth image using information from tracking objects in the RGB images, the corrected depth image and the RGB image are output, and processing continues 302 with the next depth-RGB image pair. Error correction that may be performed is described in more detail below.

As was previously mentioned, depth images may include errors due to such things as limited working depth range, systemic noise, presence of shiny, metallic, or glossy objects in a scene, and/or if the scene is outdoors. The particular errors detected and the algorithm(s) applied to correct detected errors in the depth image are implementation dependent. Further, particular errors detected and the algorithm(s) applied to correct detected errors in the depth image may depend on the particular application 214. For example, if the scene is known not to be outdoors or to include glossy, metallic, or shiny objects, there is no need to detect and correct errors caused by these factors.

There are many different ways that errors can be detected in a depth map given prior information about the particular application employing a TOF-RGB sensor pair. For example, it is well known that depth images with no errors are likely to be smooth and textureless with sharp discontinuities at object boundaries. It is also known that errors due to specularities show up in a depth image as random depth spikes on an otherwise smooth scene. Thresholding may be used to detect specularity errors as the depth of the spikes will much greater than the points around the spikes.

In another example, errors in a depth image may be detected based on modeling of objects expected to be found in a scene. For example, in a scene where a human is detected, prior knowledge derived from modeling humans, e.g., human appearance and expected speed of movement, and image capture speed of the sensor may be used to detect working depth range errors in a depth image.

In another example, machine learning may be used to detect errors in depth images. Application specific knowledge regarding "normal" depth images may be encoded by a machine learning application by collecting image data in ideal settings. A classifier may then be used in normal operation to detect anomalies. For example, in an industrial setting, sunlight may stream through a window during the day and could cause specularities. Depth image data could be collected at night and used to train the machine learning application. In normal operation in daylight hours, the classifier could then be used to detect any anomalies caused by sunlight.

The error correction applied depends on the error or errors detected, i.e., the appropriate vision or imaging algorithm to apply to remove an error depends on the particular error. There are at least two broad categories of algorithms that could be used, those that spatially smooth the depth image using the RGB images for segmentation and those that temporally smooth the depth image using consistencies in the RGB images.

Four examples of error detection and correction that may be used are now explained. In a first example, as previously mentioned, TOF sensors may have systemic noise. This means that, effectively, the TOF sensor may report that the surfaces of objects in a scene are covered with jagged, rough shapes. Suitable computer vision algorithms may be used to recognize the material properties of the scene in RGB images (skin vs. snow vs. plastic vs. wood). If the depth image data disagrees with the recognized material properties in the RGB images, appropriate smoothing algorithms may be applied to the depth image to remove any noisy depth measurements.

For example, segmentation may be performed on the RGB image of a depth-RGB image pair to identify smooth regions of the RGB image, e.g., regions in which the pixels in the region are approximately the same color. Because the RGB and depth images are aligned, these smooth RGB regions automatically denote regions in the depth image that should also be smooth. A smooth region in a depth image is a region in which the depths in the region do not vary very much from an average depth in the region. Any point with a depth that is much greater or lesser than the average depth is suspect. Smoothing may be applied to these suspect depths to correct the detected errors.

In a second example, as previously mentioned, depth images from a TOF sensor may include errors due to the presence of shiny, metallic, or glossy objects in a scene. Consider the simple example of FIG. 9 in which a glossy/specular/shiny object in a scene is viewed by a TOF-RGB sensor pair. When a moving object reflects light directly into the TOF sensor, the depth image will have a sharp discontinuity that did not exist before. While it is possible that there is some sharp break in the object, again it is unlikely that this has occurred.

Figure 9:
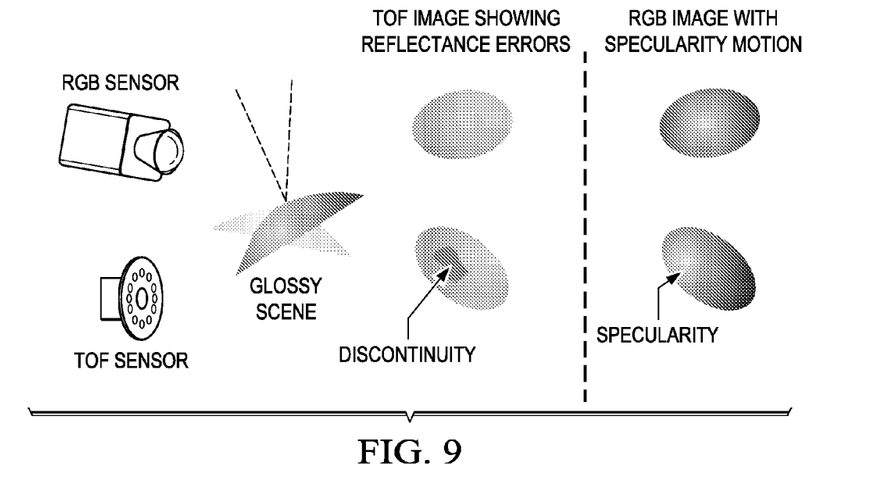

Whether or not a sharp break has occurred can be determined by analysis of the current RGB image and the object tracking information. In this example, it would be clear that while the specularity has moved, the object itself is still in one piece. If such an event is detected, the alignment of the RGB and depth images can be exploited to locate the region of the depth image needs to be corrected. This correction may be performed, for example, by smoothing any depths in the region that are much greater than or lesser than the average depth in the region.

In a third example, as previously mentioned, outdoor scenes are notoriously difficult for TOF sensors. Consider the simple example of FIG. 10 in which the TOF-RGB sensor pair is viewing a sunlit outdoor scene. Under reasonable sunlight and other similar illumination effects, the error detection and correction may provide a "graceful degradation" result for the depth image. This degradation may be achieved by applying a segmentation algorithm to the RGB image. As previously mentioned, segmentation creates clusters of pixels that are spatially located together and that have the same material properties. These segmented clusters are referred to as regions. For example, the tree in the example may be segmented into two regions, the trunk and the leaves. Further, the pixels in these regions should have approximately the same depth.

Figure 10:
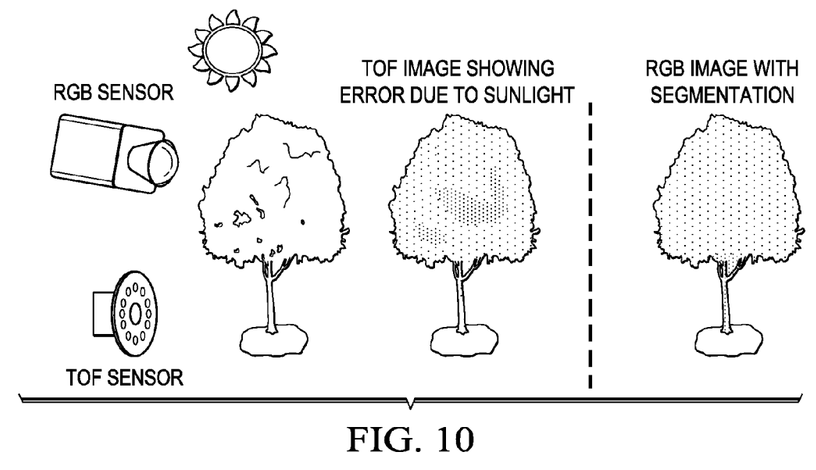

The segmentation can be used as a regularizer, i.e., the segmentation can be used determine that "these pixels in a region should probably be around the same depth". However, the effect of the sunlight on the depth image may be that the corresponding regions in the depth image have a variety of noisy depths. The depths in a region may be analyzed statistically to decide what depth should actually be used, e.g., by finding the most frequently occurring depth, and smoothing may be applied to the region based on this depth.

Figure 8:
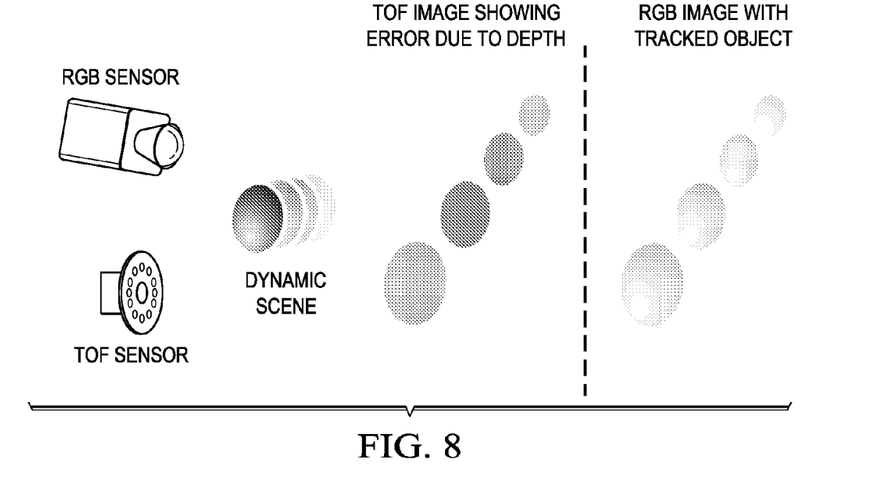

In a fourth example, as previously mentioned, TOF sensors have a fixed working range. When an object in the scene is outside this working range, a TOF sensor "repeats" or "cycles" through the limited depth range. Consider the simple example of FIG. 8 showing a sphere approaching a TOF-RGB sensor pair. The depth images are shown over time, and the color-coding is "lighter=farther and darker=closer". As the figure demonstrates, the sphere becomes progressively darker as it approaches the TOF sensor. However, once some "closest range" is crossed, the TOF sensor stops working and loops the depth to the far (light) value of the TOF sensor range.

Mathematically, this effect occurs because the TOF sensor works on the phase difference between the emitted and received IR (infra red) signals. The phase is calculated via a modulo function, and such functions have this "repeat" or "cycling" property. In effect, the TOF sensor is communicating that the sphere suddenly jumped from a very close location to a very far location. This is unlikely, but from the TOF image alone it is difficult to detect if this unlikely event happened or not. However, whether or not an object has suddenly far away can be detected using information from object tracking performed on the sequence of RGB images. The object tracking can provide some cues, such as the perspective size of an object, that indicate whether or not the object has suddenly moved. Further, many object tracking algorithms estimate properties of moving objects, such as speed and time-to-impact. The outputs of these algorithms can be used to detect unlikely events or to confirm that they have occurred. If an error due to a "jump", "repeat" or "cycle" in a depth image is detected using information from the object tracking, the alignment of the RGB and depth images can be exploited to locate the parts of the depth image needs to be corrected. Note that such error correction effectively increases the range of the TOF sensor.

Figure 11:
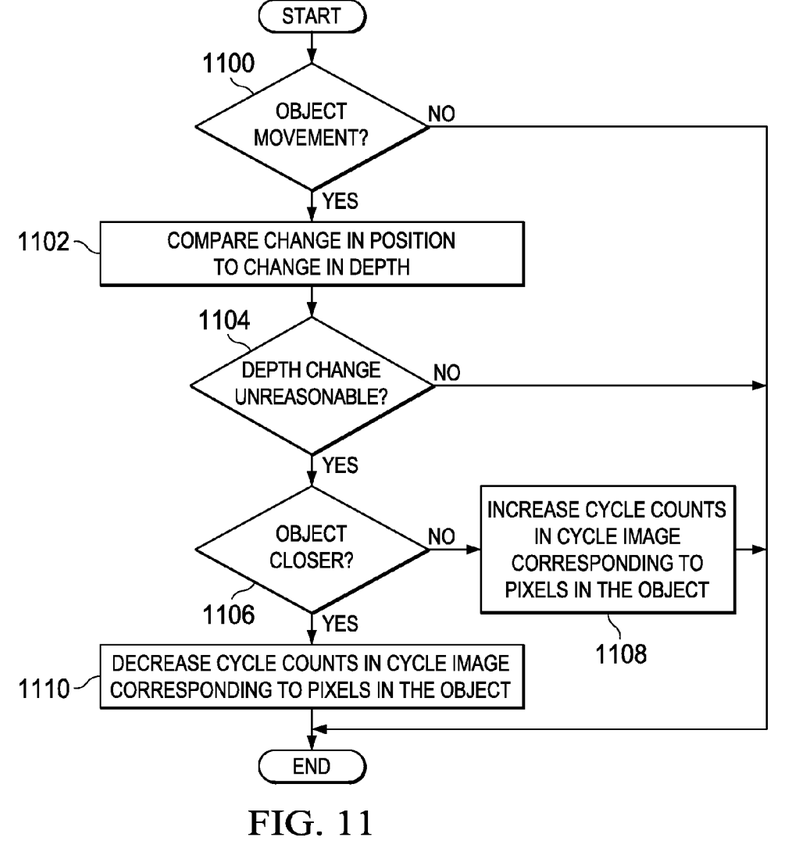

FIG. 11 is a flow diagram of a method for error detection due to the limited working range of a TOF sensor and correction of such errors that may be performed in an embodiment of the method of FIG. 3. The method may be performed for each depth-RGB image pair. Further, the method may be performed for each object in the scene. In this method, a cycle image or map is maintained that includes a cycle count for each point location in a depth image. Initially, each location in the cycle map has a cycle count of 0 and the cycle counts are updated per the method as depth-RGB image pairs are processed.

As show in FIG. 11, initially a check is made to determine 1100 if an object in the scene has moved. Such information may be determined from object tracking. If the object has not moved, the method terminates. Otherwise, the change in position of the object is compared 1102 to the change in the depth of the object indicated in the depth map. If the change in depth is reasonable 1104 as compared to the location and perspective of the object, the method terminates. Otherwise, the change in depth is unreasonable 1104, indicating that the object or at least part of the object has simply moved outside the range of the TOF sensor and the TOF sensor is cycling in its depth range for those out-of-range pixels. If the object has moved closer 1106 (which can be determined from object tracking data), then the cycle count in the cycle map corresponding to each pixel in the object that has moved out of the TOF sensor range is decreased 1110 by one. Otherwise, the object has moving further away and the cycle count in the cycle map corresponding to each pixel in the object that has moved out of the TOF sensor range is increased 1110 by one.

The error correction on the depth image is performed as follows. Prior to outputting the depth-image pair (step 310 of the method of FIG. 3), depths in the depth image are modified according to the cycle counts of the respective locations in the cycle map. More specifically, each depth value in the depth map is updated as per $$\mathrm{depth}(x,y)=\mathrm{depth}(x,y)+(\mathrm{numcycles}(x,y)*\mathrm{range})$$

where numcycles(x,y) is the current cycle count for the depth(x,y) in the cycle map and range is the top range value of the TOF sensor. For example, if the range of the TOF sensor is 0-5 meters, range=5.

Figure 4:
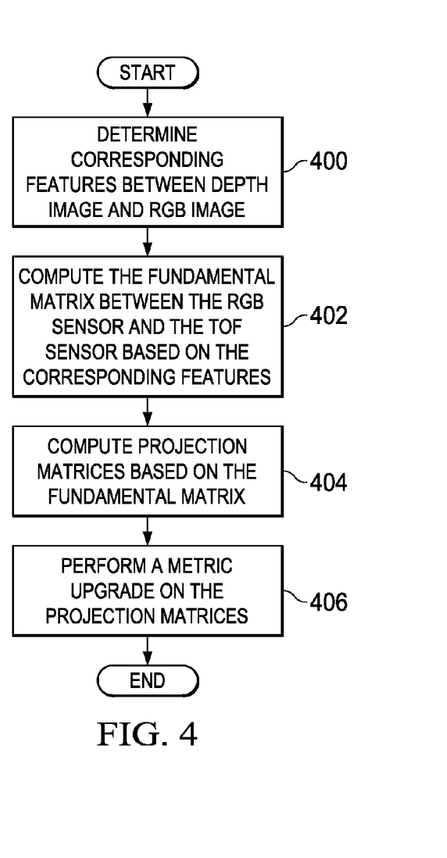

FIG. 4 is a flow diagram of a method for geometric calibration of a TOF-RGB sensor pair. The output of this method is a pair of projection matrices that may be applied to depth-RGB image pairs generated by the TOF-RGB sensor pair to align the two images. Further, the method is not based on any calibration of the sensors and is not scene dependent. The input to this method is a depth-RGB image pair generated by the TOF-RGB sensor pair. This method may be performed once as an initialization step, e.g., by the manufacturer of the digital video system incorporating the TOF-RGB sensor pair or by a user when the digital video system is placed into service.

As shown in FIG. 4, given a depth-RGB image pair, initially corresponding features are determined 400 between the depth image and the RGB image. To determine the matching features, features are detected in both the depth image and the RGB image. Any suitable feature detection algorithm may be used. Experiments have shown that line features may be preferred as the depth data from a TOF sensor is smooth. The best feature matches between the depth image and the RGB image are then determined, e.g., by spectral matching between the feature sets. The resulting set of best matching features is expected to be sparse.

Once the corresponding features have been determined, the fundamental matrix between the RGB sensor and the TOF sensor is computed 402 based on these corresponding features. The computation is performed as per $$(p_{rgb})' F p_{depth} = 0$$

where F is the 3×3 fundamental matrix and $p_{rgb}$ and $p_{depth}$ are the corresponding features in the two images.

Given the fundamental matrix F, 3×4 projection matrices (also referred to as camera matrices) for the TOF sensor and the RGB sensor are computed 404 as per $$P_{rgb} = [I|0]$$

$$P_{depth} = [[e']_x F|e']$$

where I is the 3×3 identity matrix, e' is the epipolar motion, and the cross product notation $[a]_x$ is the matrix form of the cross product corresponding to the vector a.

A Euclidean metric upgrade is then performed 406 on the two projection matrices to generate final projection matrices. Given the depth image, the true locations of the points in $p_{depth}$ are known. Thus, the depths given by the projection matrices $P_{rgb}$ and $P_{depth}$ can be warped to the actual depths in the depth image. Given at least eight corresponding features between the depth image and the RGB image, a homography H (basically a warp) is estimated that corrects the depth image and the projection matrices and this homography is applied to the projection matrices to "upgrade" the matrices to the final matrices that will align images pairs from the TOF-RGB sensor pair, i.e., $$P'_{rg} = P_{rgb} H$$

$$P'_{depth} = P_{depth} H.$$

Figure 5:
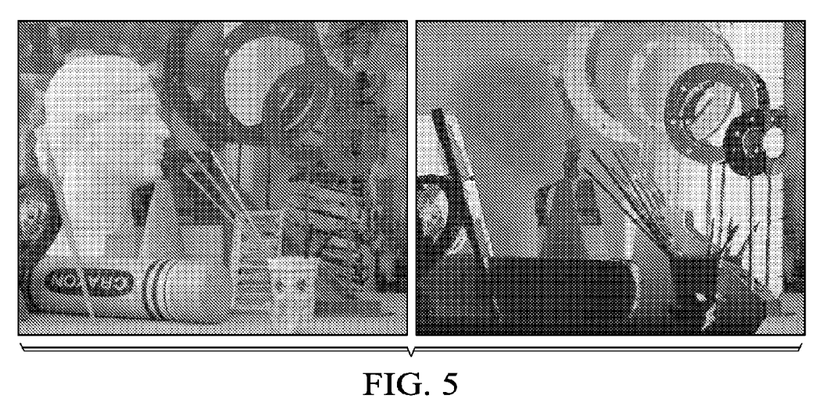
FIGS. 5-10 are examples.
Figure 6:
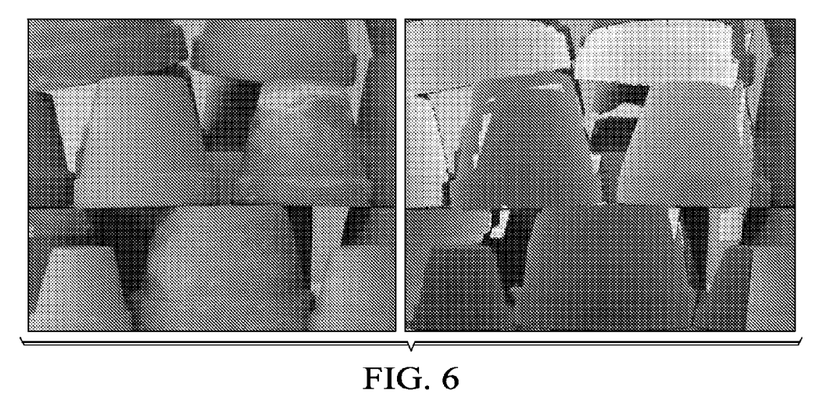
Figure 7:
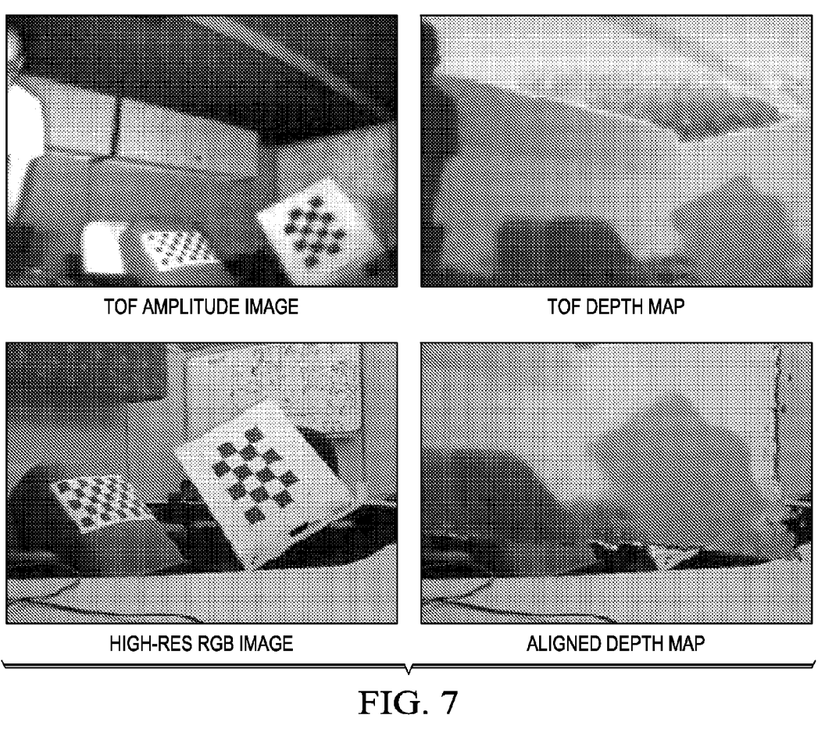

FIGS. 5, 6, and 7 are examples of RGB and depth images aligned using projection matrices generated by an embodiment of the method of FIG. 4.

Other Embodiments

While the invention has been described with respect to a limited number of embodiments, those skilled in the art, having benefit of this disclosure, will appreciate that other embodiments can be devised which do not depart from the scope of the invention as disclosed herein.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method of improving depth sensor data in real-time based on scene sensor data, the method comprising:
   estimating, with one or more processor circuits, a homography H between a depth image and a scene image of a depth-scene image pair included in a plurality of depth-scene image pairs generated by a depth-scene image sensor pair, the depth-scene image sensor pair including a depth sensor and a scene sensor;
   aligning, with the one or more processor circuits, depth images of the depth-scene image pairs with corresponding scene images based on the homography H, wherein for each depth-scene image pair, the depth image is warped based on the homography H such that locations of depths in the depth image are aligned with locations of corresponding pixels in the scene image; and
   correcting, with the one or more processor circuits, at least some of the aligned depth images based on image data from one or more of the scene images.

2. A digital video system comprising:
   a depth-scene image sensor pair configured to capture depth-scene image pairs of a scene, the depth-scene image sensor pair including a depth sensor and a scene sensor;
   means for estimating a homography H between a depth image and a scene image of a depth-scene image pair included in the depth-scene image pairs generated by the depth-scene image sensor pair;
   means for aligning depth images of the depth-scene image pairs with corresponding scene images based on the homography H, wherein for each depth-scene image pair, the depth image is warped based on the homography H such that locations of depths in the depth image are aligned with locations of corresponding pixels in the scene image; and
   means for correcting at least some of the aligned depth images based on image data from one or more of the scene images, wherein the means for correcting at least some of the aligned depth images comprises:
      means for detecting at least one error in a region of an aligned depth image of a first depth-scene image pair based on content of a corresponding region of a scene image of the first depth-scene image pair; and
      means for correcting the detected at least one error in the region of the aligned depth image, wherein the means for detecting at least one error comprises:
         means for determining that at least part of an object in the scene image of the first depth-scene image pair has moved outside a range of the depth sensor;
         means for increasing a cycle count in a cycle map by one for each pixel of the object outside the range if the object has moved further away, wherein the cycle map includes a cycle count for each location of the depth image of the first depth-scene image pair; and
         means for decreasing the cycle count by one for each pixel of the object outside the range if the object has moved closer; and
      the means for correcting the detected at least one error comprises means for modifying depths in the aligned depth image of the first depth-scene image pair based on corresponding cycle counts in the cycle map and the range of the depth sensor.

3. A non-transitory computer readable medium comprising instructions that, when executed by at least one processor in a digital video system, cause the processor to:
- estimate a homography H between a depth image and a scene image of a depth-scene image pair included in a plurality of depth-scene image pairs generated by a depth-scene image sensor pair, the depth-scene image sensor pair including a depth sensor and a scene sensor;
- align depth images of depth-scene image pairs generated by a depth-scene image sensor pair with corresponding scene images wherein, for each depth-scene image pair, the depth image is warped such that locations of depths in the depth image are aligned with locations of corresponding pixels in the scene image; and
- correct at least some of the aligned depth images based on image data from one or more of the scene images.

4. The method of claim 1, wherein aligning depth images further comprises:
- applying an inverse of the homography H to the depth image to generate a warped depth image, wherein a depth sensor projection matrix is used to generate the warped depth image; and
- applying a scene sensor projection matrix to the warped depth image to generate an aligned depth image,
- wherein estimating the homography H includes estimating the homography H based on at least eight corresponding features between the depth image and the scene image of a first depth-scene image pair, wherein the homography H relates pixel coordinates of a scene image of the first depth-scene pair to point coordinates of a depth image of the first depth-scene pair.

5. The method of claim 1, wherein the depth sensor is a time-of-flight (TOF) sensor.

6. The method of claim 1, wherein the scene sensor is a red-green-blue (RGB) sensor.

7. The method of claim 1, wherein correcting at least some of the aligned depth images comprises:
- detecting at least one error in a region of an aligned depth image of a first depth-scene image pair based on content of a corresponding region of a scene image of the first depth-scene image pair; and
- correcting the detected at least one error in the region of the aligned depth image.

8. The method of claim 7, wherein
- detecting at least one error comprises identifying a smooth region in the scene image of the first depth-scene image pair and determining that a corresponding region in the aligned depth image of the first depth-scene image pair is not smooth; and
- correcting the detected at least one error comprises applying smoothing to the corresponding region.

9. The method of claim 7, wherein
- detecting at least one error comprises:
  - determining that at least part of an object in the scene image of the first depth-scene image pair has moved outside a range of the depth sensor;
  - increasing a cycle count in a cycle map by one for each pixel of the object outside the range if the object has moved further away, wherein the cycle map includes a cycle count for each location of the depth image of the first depth-scene image pair; and
  - decreasing the cycle count by one for each pixel of the object outside the range if the object has moved closer; and
- correcting the detected at least one error comprises modifying depths in the aligned depth image of the first depth-scene image pair based on corresponding cycle counts in the cycle map and the range of the depth sensor.

10. The non-transitory computer readable medium of claim 3, wherein the instructions that cause the processor to align depth images include instructions that cause the processor to:
- apply an inverse of the homography H to the depth image to generate a warped depth image, wherein a depth sensor projection matrix is used to generate the warped depth image; and
- apply a scene sensor projection matrix P to the warped depth image to generate an aligned depth image,
- wherein the instructions that cause the processor to estimate the homography H include instructions that cause the processor to estimate the homography H based on at least eight corresponding features between the depth image and the scene image of a first depth-scene image pair, wherein the homography H relates pixel coordinates of a scene image of the first depth-scene pair to point coordinates of a depth image of the first depth-scene pair.

11. The non-transitory computer readable medium of claim 3, wherein the depth sensor is a time-of-flight (TOF) sensor and the scene sensor is a red-green-blue (RGB) sensor.

12. The non-transitory computer readable medium of claim 3, wherein the instructions that cause the processor to correct at least some of the aligned depth images include instructions that cause the processor to:
- detect at least one error in a region of an aligned depth image of a first depth-scene image pair based on content of a corresponding region of a scene image of the first depth-scene image pair; and
- correct the detected at least one error in the region of the aligned depth image.

13. The non-transitory computer readable medium of claim 12, wherein the instructions that cause the processor to:
- detect at least one error include instructions that cause the processor to identify a smooth region in the scene image of the first depth-scene image pair and determine that a corresponding region in the aligned depth image of the first depth-scene image pair is not smooth; and
- correct the detected at least one error include instructions that cause the processor to smooth to the corresponding region.

14. The non-transitory computer readable medium of claim 12, wherein the instructions that cause the processor to:
- detect at least one error include instructions that cause the processor to:
  - determine that at least part of an object in the scene image of the first depth-scene image pair has moved outside a range of the depth sensor;
  - increase a cycle count in a cycle map by one for each pixel of the object outside the range if the object has moved further away, wherein the cycle map includes a cycle count for each location of the depth image of the first depth-scene image pair; and
  - decrease the cycle count by one for each pixel of the object outside the range if the object has moved closer; and
- correct the detected at least one error include instructions that cause the processor to modify depths in the aligned depth image of the first depth-scene image pair based on corresponding cycle counts in the cycle map and the range of the depth sensor.

* * * * *